United States Patent
Hanaoka

(10) Patent No.: US 6,837,986 B2
(45) Date of Patent: Jan. 4, 2005

(54) DEVICE FOR PRODUCING ELECTROLYTIC WATER AND PROCESS FOR PRODUCING ELECTROLYTIC WATER

(75) Inventor: Kokichi Hanaoka, 1041-2, Oaza-Ueda, Ueda-shi, Nagano (JP), 386-0001

(73) Assignees: Mikuni Corporation, Tokyo (JP); Kokichi Hanaoka, Nagano (JP)

( * ) Notice: Subject to any disclaimer, the term of this patent is extended or adjusted under 35 U.S.C. 154(b) by 248 days.

(21) Appl. No.: 10/124,136

(22) Filed: Apr. 17, 2002

(65) Prior Publication Data

US 2002/0185380 A1 Dec. 12, 2002

(30) Foreign Application Priority Data

May 18, 2001 (JP) ........................................ 2001-148844

(51) Int. Cl.[7] .................................................. C02F 1/461
(52) U.S. Cl. ...................... 205/746; 204/252; 204/230.2
(58) Field of Search ................................ 205/746, 252; 204/252, 230.2

(56) References Cited

U.S. PATENT DOCUMENTS

| | | | |
|---|---|---|---|
| 5,736,027 A | | 4/1998 | Nakamura ................... 205/742 |
| 5,795,459 A | * | 8/1998 | Sweeney ..................... 205/701 |
| 6,527,940 B1 | * | 3/2003 | Shimamune et al. ........ 205/464 |
| 6,551,492 B2 | * | 4/2003 | Hanaoka ..................... 205/742 |
| 2002/0027079 A1 | | 3/2002 | Hanaoka ..................... 205/50 |

* cited by examiner

Primary Examiner—Arun S. Phasge
(74) Attorney, Agent, or Firm—Norris McLaughlin & Marcus PA

(57) ABSTRACT

This invention discloses a device for producing electrolytic water (100) comprising an electrode unit (2) comprising a closed-type anode chamber (16), at least part of whose wall is a septum (18) and within which an anode (20) is disposed, and a cathode (24) disposed outside of the anode chamber (16); and a power source unit (4) for supplying DC power to the electrode unit (2). Electrolysis is conducted by filling the anode chamber (16) of the device for producing electrolyte water with a 0.01 to 2 M aqueous electrolyte solution while immersing the device for producing electrolyte water in a 0.001 to 0.01 M aqueous electrolyte solution and then supplying electric power between the anode and the cathode. For example, tap water may be directly used as the 0.001 to 0.01 M aqueous electrolyte solution.

5 Claims, 4 Drawing Sheets

DEVICE FOR PRODUCING ELECTROLYTIC WATER AND PROCESS FOR PRODUCING ELECTROLYTIC WATER

BACKGROUND OF THE INVENTION

1. Field of the Invention

This invention relates to a device for producing electrolytic water and a process for producing electrolytic water using the device. The electrolytic water thus produced can be used for drinking, sterilization, disinfection and an astringent.

2. Description of the Related Art

Electrolysis of water is one of electrochemical phenomena, which causes change in water properties, provides a novel chemical substance and/or generates different electrolysis products in an anode and a cathode sides. Since electrolysis phenomenon can be quantitatively handled, it has been industrially utilized in various applications.

Cathodic electrolytic water generated by electrolysis of water is used for drinking, while anodic electrolytic water is used for, e.g., an astringent.

There has been established a technique that tap water is directly electrolyzed to continuously get cathodic electrolytic water. A device for producing electrolytic water utilizing the technique has been also commercially available in a general market, and has been commonly used in ordinary homes.

In this flow type device for producing electrolytic water, tap water is pre-purified by a filter using an adsorption medium such as activated charcoal, and then the purified tap water is continuously fed to an electrolytic cell, where electrolytic water is continuously produced. For improving production performance for electrolytic water, the electrolytic cell is typically composed of a plurality of parallel electrolysis chambers, each of which comprises a cathode and an anode separated from each other by a septum.

Of these devices for continuously producing electrolytic water, there is a special device without a septum. In such a device for producing electrolytic water, an electrolysis chamber is designed such that an aqueous electrolyte solution flows as a laminar flow along electrodes to prevent cathodic electrolytic water from being mixed with anodic electrolytic water.

A batch type device for producing electrolytic water comprising an anode and a cathode chambers is also widely known.

There have been recently developed techniques that anodic electrolytic water is utilized for sterilization or disinfection, which is produced by intensely electrolyzing water while adding an electrolyte including sodium chloride as an electrolysis aid to the device for producing electrolytic water.

All of the techniques separately remove anodic and cathodic electrolytic waters generated in the device for producing electrolytic water and utilize these waters to a variety of applications.

Such a device for producing electrolytic water, however, does not necessarily meet individual's needs due to its larger size or higher price.

SUMMARY OF THE INVENTION

In view of the above problems, the inventor has investigated a device for producing electrolytic water in various ways and has finally conceived an idea of a device for producing electrolytic water comprising a closed-type anode chamber separated from a cathode side by a septum through which cations can pass. Specifically, the inventor has found that electrolytic water can be easily produced by filling the anode chamber of the device with an aqueous concentrated electrolyte solution and directly electrolyzing tap water using the device, and that an electrolyte can be selected to produce electrolytic water supplied with desired minerals. This invention has been achieved on the basis of the above findings.

Thus, an objective of this invention is to provide an inexpensive device for producing electrolytic water and a process for producing electrolytic water, which can readily produce electrolytic water while appropriately supplying desired minerals.

To achieve the above objective, this invention provides the followings.

[1] A device for producing electrolytic water comprising an electrode unit comprising a closed-type anode chamber, at least part of whose wall is a septum and within which an anode is disposed, and a cathode disposed outside of the anode chamber; and a power source unit for supplying DC power to the electrode unit.

[2] The device for producing electrolytic water as described in [1] wherein the septum is an uncharged neutral film or cation-exchange film.

[3] The device for producing electrolytic water as described in [1] wherein the power source unit comprises a control system.

[4] A process for producing electrolytic water, using a device for producing electrolytic water comprising an electrode unit comprising a closed-type anode chamber, at least part of whose wall is a septum and within which an anode is disposed, and a cathode disposed outside of the anode chamber; and a power source unit for supplying DC power to the electrode unit, comprising the steps of:

filling the anode chamber with a 0.01 to 2.0 M aqueous electrolyte solution while immersing the electrode unit in a 0.001 to 0.01M aqueous electrolyte solution; and conducting electrolysis by supplying an electric power between the anode and the cathode.

[5] The process for producing electrolytic water as described in [4] wherein the electrolyte in the aqueous electrolyte solution filled in the anode chamber is one or more selected from the group consisting of hydrochlorides, bicarbonates, sulfates and citrates of sodium, potassium, calcium, magnesium and zinc.

[6] The process for producing electrolytic water as described in [4] wherein the 0.001 to 0.01 M aqueous electrolyte solution in which the device for producing electrolytic water is immersed is selected from the group consisting of tap water, bottled drinking water, rainwater and well water.

The device for producing electrolytic water of this invention has a simpler structure than conventional flow-type devices for producing electrolytic water, so that it can be manufactured with a lower cost and may be widely used. It is not necessary to specially prepare the cathodic aqueous electrolyte solution, that is, tap water or bottled mineral water can be directly used, and thus electrolytic water can be conveniently produced any time. In addition, cations in the anodic aqueous electrolyte solution can be appropriately selected to supply desired minerals.

Furthermore, the anodic aqueous electrolyte solution can contain chloride ions to generate a hypochlorite as a byproduct in an anodic electrolytic water, which can be used for sterilization or disinfection.

In these drawings, symbols denote the followings; 2: electrode unit, 4: power source unit, 6: casing, 8: side wall, 10: window for passage of an aqueous electrolyte solution, 12: upper wall, 14: lower wall, 15: partition wall, 16: anode chamber, 18: septum, 20: anode, 22: inlet for an anodic aqueous electrolyte solution, 24: cathode, 26,28: interconnections, 30: electrolysis control unit, 50: water tank, 52: water, 100: device for producing electrolytic water.

DETAILED DESCRIPTION OF PREFERRED EMBODIMENTS

This invention will be detailed with reference to the drawings.

Figure 1:
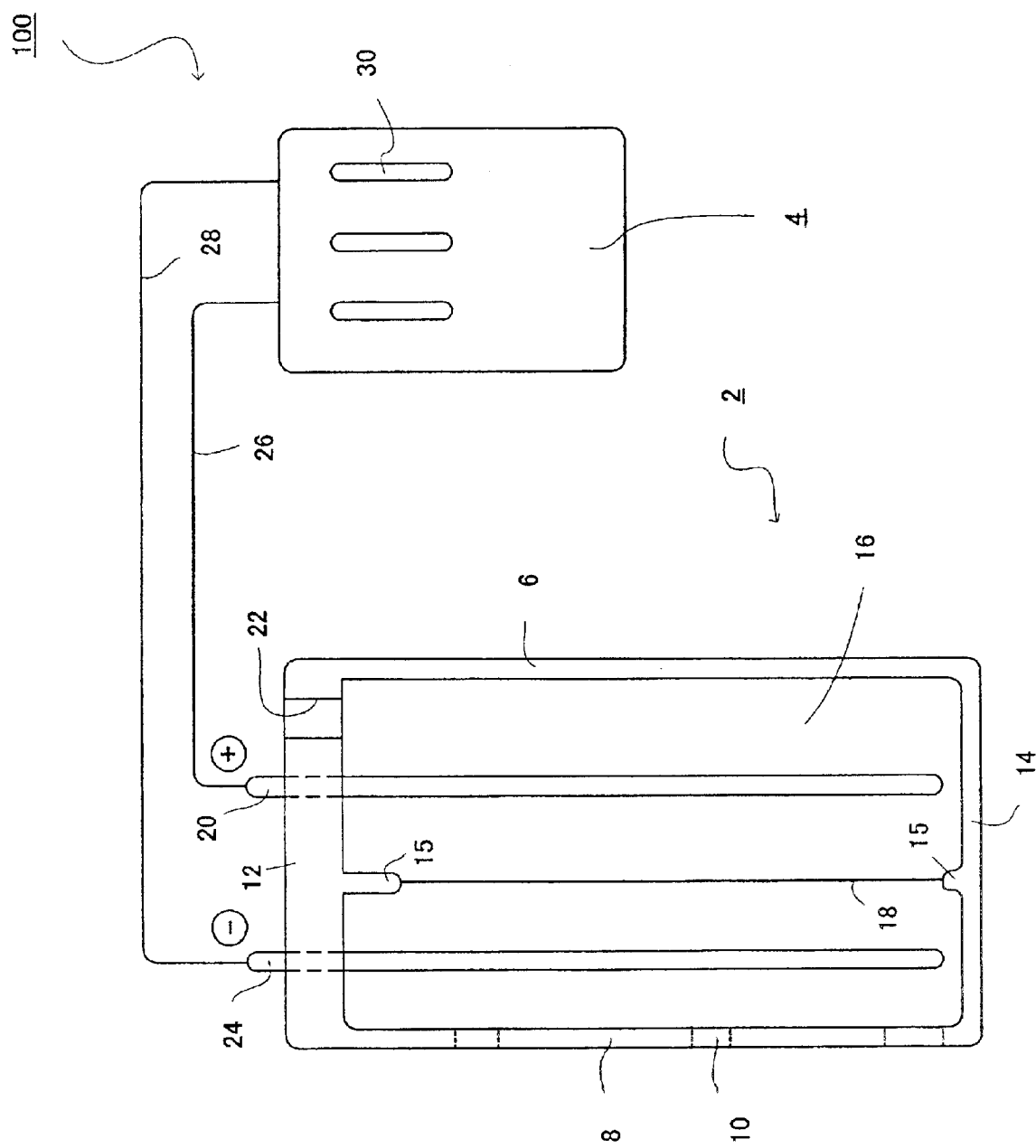
FIG. 1 is a schematic diagram showing an example of a device for producing electrolytic water according to this invention.

FIG. 1 illustrates a configuration example of a device for producing electrolytic water according to this invention. In this figure, 100 is a device for producing electrolytic water consisting of an electrode unit 2 and a power source unit 4 as main components.

In the electrode unit 2, 6 is a rectangular hollow casing made of an insulating material such as plastics, ceramics and glasses. A side wall 8 in the casing has a plurality of windows 10 for passage of an aqueous electrolyte solution with relatively lower concentration (not shown) (three windows in this case).

In the casing 6, a partition wall 15 is formed from an upper wall 12 to a lower wall 14, delimiting an anode chamber 16. The partition wall 15 is cut to make an opening and a septum 18 is fluid-tightly stretched over the opening. By this configuration, the inside of the closed anode chamber 16 surrounded with the casing 6, the partition wall 15 and the septum 18 can be separated from the outside of the anode chamber 16 to ensure fluid-tightness between the inside and the outside.

Examples of a septum which may be preferably used include uncharged porous septums such as Goretex™ and Flemion™ and anion-exchange films.

In the anode chamber 16, a flat anode 20 penetrating the upper wall 12 is inserted. The anode 20 and the septum 18 face each other in parallel.

In this figure, 22 is an inlet for an anodic aqueous electrolyte solution, which is formed in the upper wall 12.

Then, 24 is a flat cathode, which is inserted through the upper wall 12 of the casing 6 into the casing 6 outside of the anode chamber 16. The cathode 24 faces the septum 18 in parallel.

The anode 20 and the cathode 24 are connected with the power source unit 4 via interconnections 26 and 28, respectively. The power source 4 supplies electric power to each electrode while controlling an electrolysis current and an electrolysis time. Electric power may be DC power supplied from a battery or power supplied after rectifying AC power. In this figure, 30 is an electrolysis control unit adjusting an electrolysis current and an electrolysis time.

Next, production of electrolytic water using the above device for producing electrolytic water will be described with reference to FIG. 2.

In this figure, 50 is a water tank filled with water 52 containing a relatively lower concentration of electrolyte. The water is preferably harmless to human, including tap water, bottled drinking water, well water, rainwater and river water. The water typically contain a variety of ions such as alkali-metal ions such as sodium and potassium ions and calcium, iron, aluminum, zinc, chloride, carbonate and sulfate ions at relatively lower concentrations. A concentration of electrolytes in the water is preferably 0.05 M or less, more preferably 0.001 to 0.03 M. Such an ion level is within an ion level range in common tap water. Readily available water such as tap water may be, therefore, used without adding an electrolyte.

In this invention, the lower part of the electrode unit 2 is immersed in the water 52 in the water tank.

Then, as shown in FIG. 1, an aqueous electrolyte solution with a relatively higher electrolyte concentration (not shown) is fed to the anode chamber 16 through the inlet for an anodic aqueous electrolyte solution 22 formed in the upper wall 12 of the electrode unit 2.

Examples of a preferable electrolyte contained in this aqueous electrolyte solution with a relatively higher electrolyte concentration include monovalent-monovalent electrolytes such as sodium chloride and potassium chloride; and bivalent-monovalent electrolytes such as calcium chloride and magnesium chloride. Furthermore, an additional mineral such as zinc and selenium may be added. A concentration of the additional mineral is preferably 0.005 to 0.01 M.

An electrolyte concentration is preferably 0.01 to 2 M, particularly 0.5 to 2.0 M as the total concentration of these ions.

Then, electric power is supplied to the electrolysis control unit 30 from the electric source unit 4. The control unit 30 supplies DC power controlled to preferable electrolysis conditions to the electrodes 20 and 24 through the interconnections 26 and 28, respectively, whereby anions and cations of electrolyte ions in the cathode side move to the anode and the cathode, respectively, while in the anode chamber, cations move to the cathode through the septum and anions moves to the anode.

The following reaction occurs in the cathode.

$$2H_2O + 2e \rightarrow 2OH^- + H_2 \qquad (1)$$

$$M^+ + OH^- \rightarrow MOH \qquad (2)$$

The following reaction occurs in the anode.

$$2H_2O \rightarrow 4H^+ + O_2 + 4e \qquad (3)$$

$$H^+ + X^- \rightarrow HX \qquad (4)$$

wherein M represents a cation such as alkali-metal ions and X represents an anion such as halide, carbonate and sulfate ions.

In the cathode, pH is increased as indicated by the above equation, while it is decreased in the anode.

Electrolysis as described above can, therefore, readily generate cathodic electrolytic water in the water tank 50.

Since electrolysis can be conducted while separating an anodic electrolyte solution from the cathode using the production device of this invention, the electrolytic waters generated in these electrodes are never mixed each other despite of batch style electrolysis.

In the above electrode unit 2, the septum 18 is stretched covering the opening of partition wall 15 of the anode chamber 16. This invention is, however, not limited to the configuration and septums may be individually stretched on a plurality of walls constituting the anode chamber 16. In the above, the casing and the anode chamber is a rectangular solid, but this invention is not limited to it and may have an appropriate shape such as a cylinder and a multigonal cylinder. The shapes of the electrodes and the septum may be appropriately selected without limitation.

This invention will be specifically described with reference to Examples.

EXAMPLES

Example 1

Figure 2:
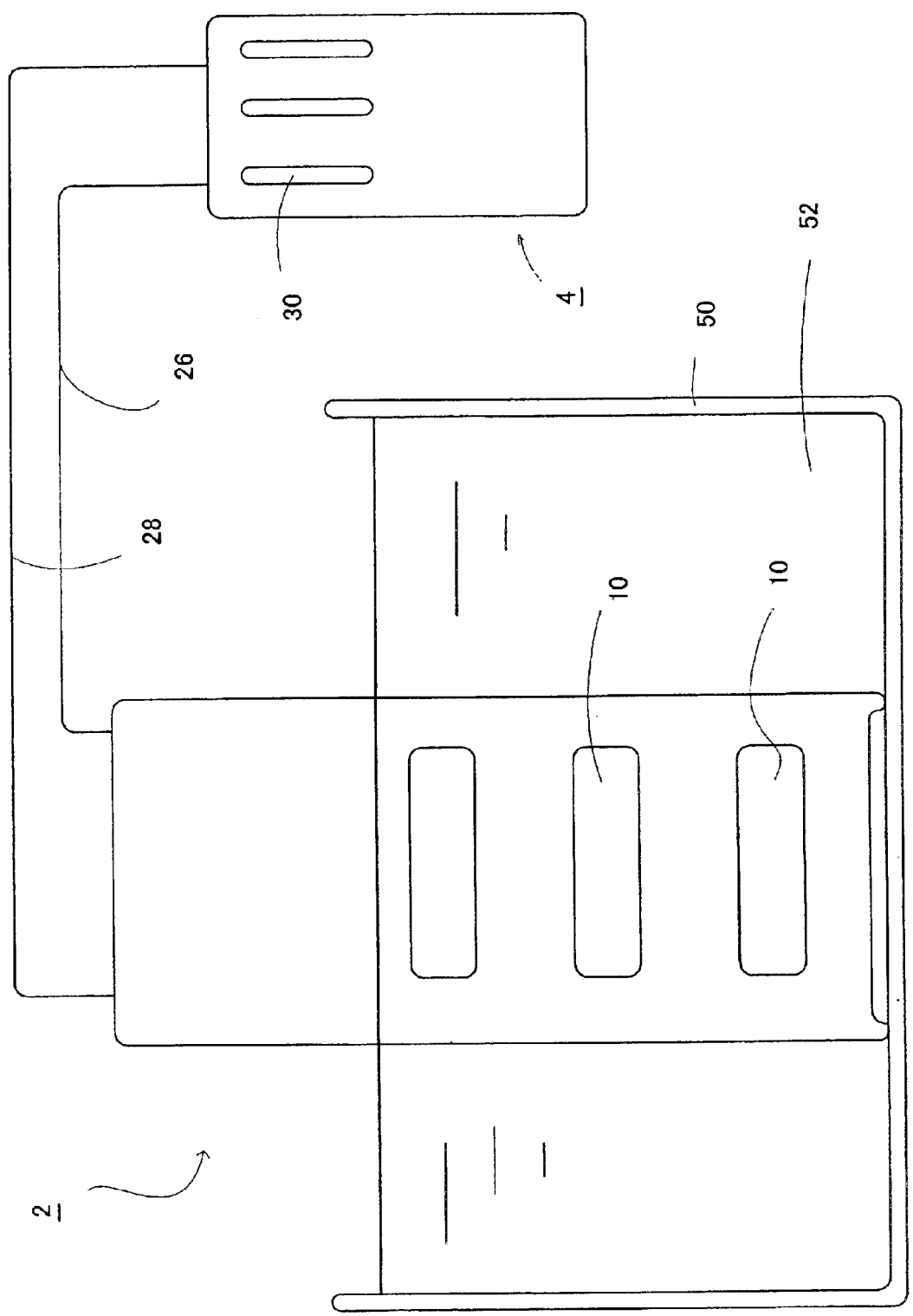
FIG. 2 illustrates an example of production of electrolytic water using a device for producing electrolytic water according to this invention.

Electrolytic water was produced using the device for producing electrolytic water in FIG. 1 as shown in FIG. 2. In the device, the dimensions of the anode chamber are $10 \times 5 \times 4$ cm$^3$ and each of the septum, the cathode and the anode had a size of $10 \times 5$ cm$^2$. The cathode and the anode were made of platinum and the septum was a cation-exchange film (Asahi Glass Co., Ltd., Trade Name: Arsansep).

In the anode chamber was placed 200 mL of 0.1 M sodium chloride. The electrode unit 2 was immersed in one liter of water (raw water) containing 2 mM sodium chloride, and then electrolysis was conducted at a DC current of 0.31 A and a voltage of 8 V for 30 sec. Table 1 shows a pH value, an oxidation-reduction potential (ORP) and a dissolved oxygen level (DO) for the cathodic electrolytic water.

TABLE 1

|  | pH | ORP (mV) | DO (mg/L) |
|---|---|---|---|
| Raw water | 5.51 | 448 | 6.61 |
| After 30 sec electrolysis | 9.21 | 250 | 7.34 |

Example 2

Using the same device as Example 1, cathodic electrolytic water was produced as described in Example 1, except that an electrolysis time was 1 min. The properties of the water are shown in Table 2.

TABLE 2

|  | pH | ORP (mV) | DO (mg/L) |
|---|---|---|---|
| Raw water | 5.51 | 448 | 6.60 |
| After 60 sec electrolysis | 10.54 | 34 | 7.01 |

Example 3

Using the same device as Example 1, cathodic electrolytic water was produced as described in Example 1, except that an electrolysis time was 2 min. The properties of the water are shown in Table 3.

TABLE 3

|  | pH | ORP (mV) | DO (mg/L) |
|---|---|---|---|
| Raw water | 5.51 | 448 | 6.60 |
| After 120 sec electrolysis | 11.51 | −457 | 6.36 |

Figure 3:
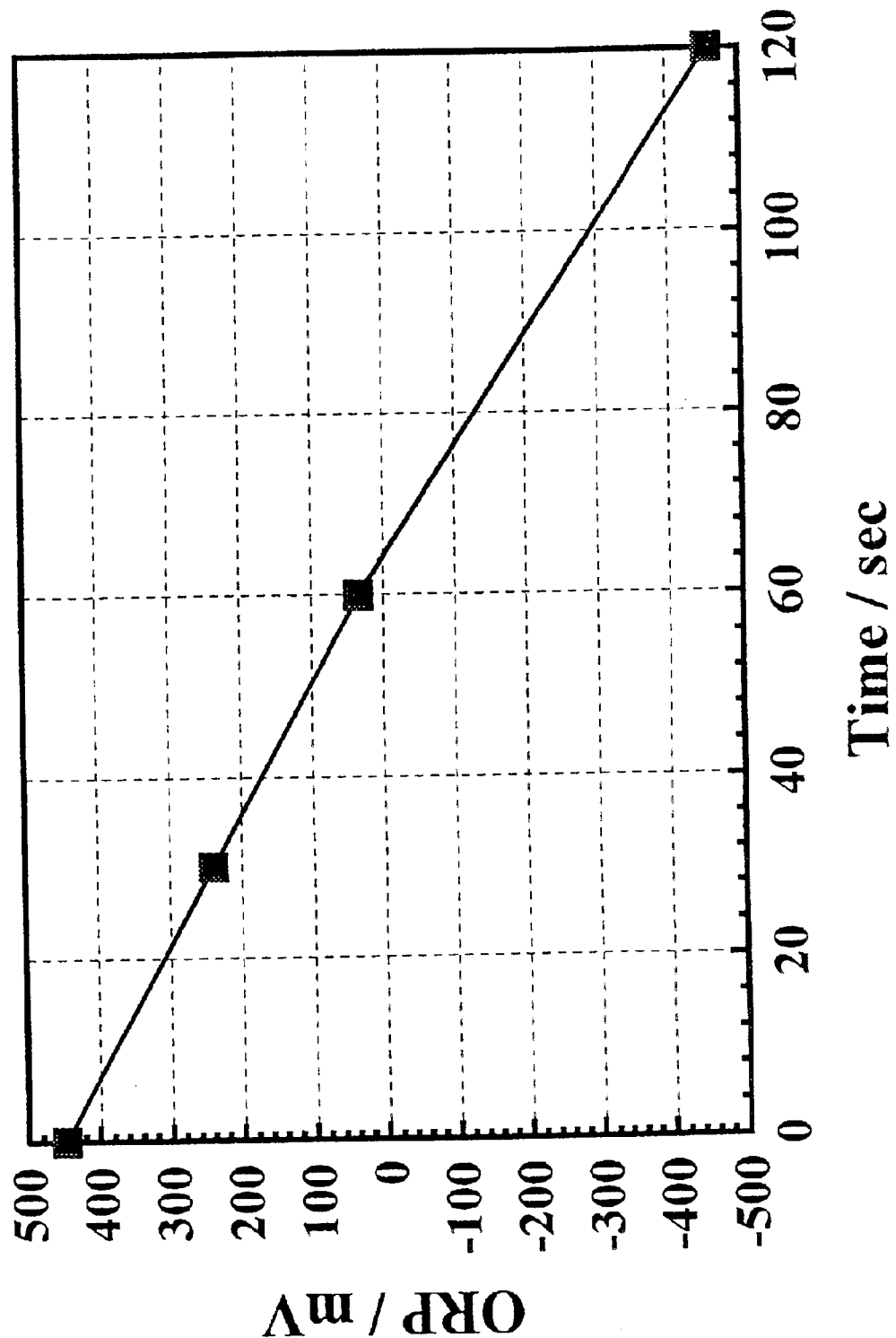
FIG. 3 is a graph showing relationship between an electrolysis time and an ORP for a cathodic electrolytic water obtained in Examples 1 to 3.
Figure 4:
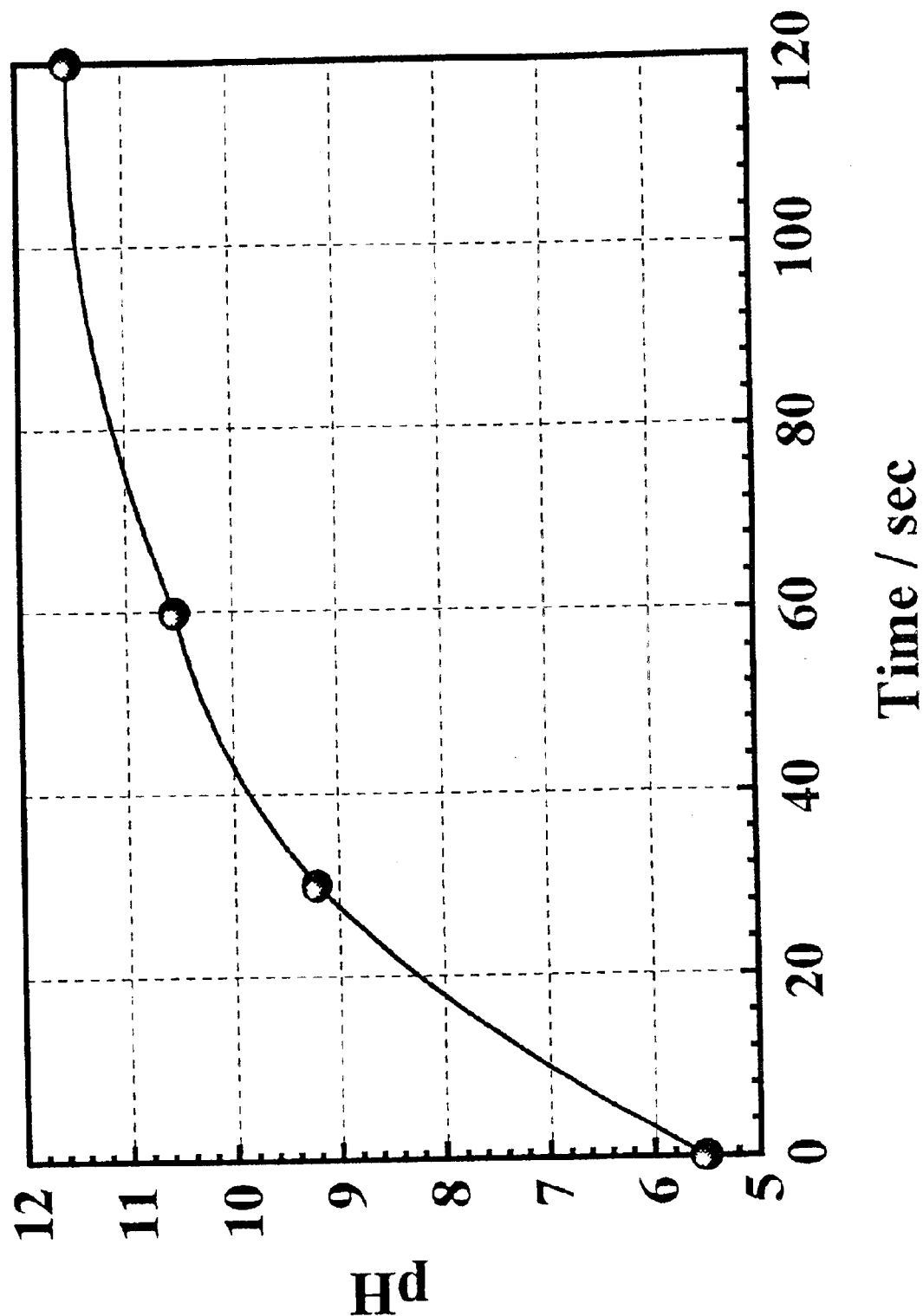
FIG. 4 is a graph showing relationship between an electrolysis time and a pH value for a cathodic electrolytic water obtained in Examples 1 to 3.

FIG. 3 is a graph showing relationship between an electrolysis 15 time and an ORP for a cathodic electrolytic water obtained in the above examples while FIG. 4 is a graph showing relationship between an electrolysis time and a pH value for a cathodic electrolytic water.

What is claimed is:

1. A device for producing electrolytic cathodic drinking water in a tank, comprising
   an electrode unit comprising a casing; an anode chamber within the casing,
   the inside of the anode chamber being separated from the outside of the anode chamber to ensure fluid-tightness between the inside and the outside,
   at least part of a wall of the anode chamber being a septum and within which an anode is disposed; and a cathode disposed within the casing and outside of the anode chamber; and
   a power source unit for supplying DC power to the electrode unit.

2. The device for producing electrolytic drinking water as claimed in claim 1, wherein the septum is an uncharged neutral film or cation-exchange film.

3. The device for producing electrolytic drinking water as claimed in claim 1 wherein the power source unit comprises a control system controlling an electrolysis current.

4. A process for batch producing electrolytic drinking water, comprising the steps of:
   providing a device for producing electrolytic drinking water, the device comprising
      an electrode unit, the electrode unit comprising a casing, and an anode chamber within the casing,
      the inside of the anode chamber being separated from the outside of the anode chamber to ensure fluid-tightness between the inside and the outside,
      at least part of a wall of the anode chamber being a septum and within which an anode is disposed, and a cathode disposed within the casing and outside of the anode chamber, and a power source unit for supplying DC power to the electrode unit,
   filling the anode chamber with a 0.01 to 2.0 M aqueous electrolyte solution while immersing the electrode unit batch-wise in water containing an electrolyte in 0.001 to 0.01 M; and
   conducting electrolysis by supplying an electric power between the anode and the cathode for moving the cations of the electrolyte in the anode chamber to the cathode side to produce electrolyte drinking water in the cathode side.

5. The process for producing electrolytic drinking water as claimed in claim 4, wherein the electrolyte in the aqueous electrolyte solution filled in the anode chamber is one or more selected from the group consisting of hydrochlorides, bicarbonates, sulfates and citrates of sodium, potassium, calcium, magnesium and zinc.

* * * * *